Sept. 3, 1935.  A. APPLEGATE  2,013,531
METHOD OF MAKING LEAD CARBONATE
Filed Aug. 28, 1930
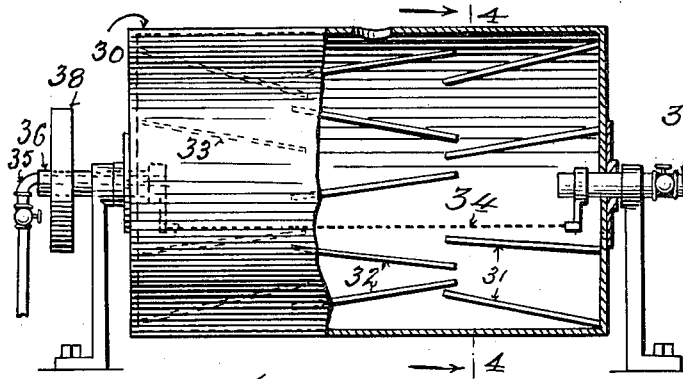
Fig. 3.
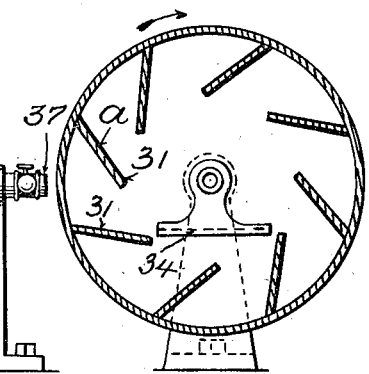
Fig. 4.
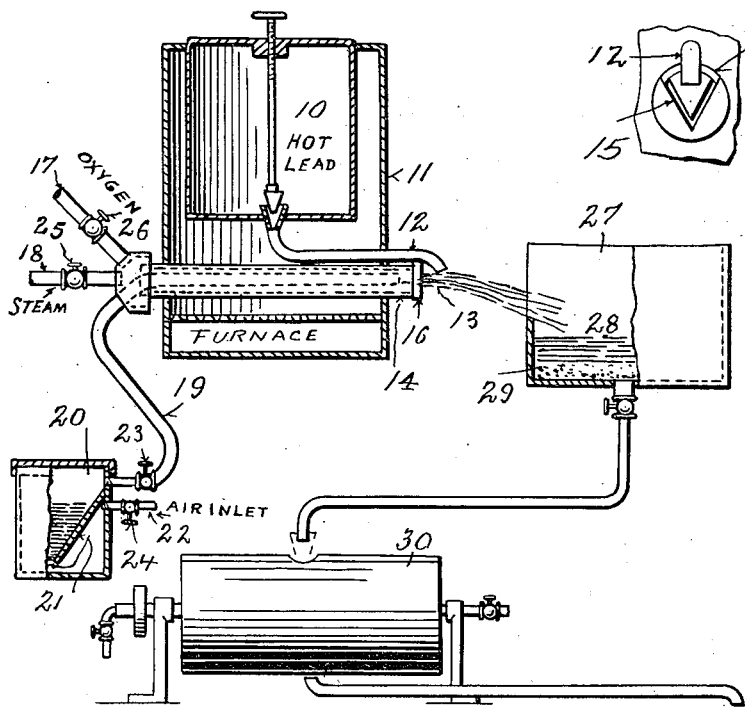
Fig. 1.
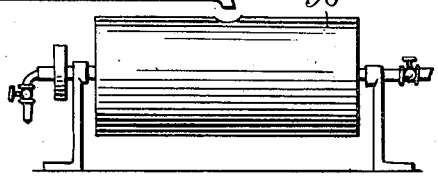
INVENTOR
Addison Applegate
BY Darby & Darby
ATTORNEY Patented Sept. 3, 1935

2,013,531

UNITED STATES PATENT OFFICE 2,013,531

METHOD OF MAKING LEAD CARBONATE

Addison Applegate, Liberty, N. Y.

Application August 28, 1930, Serial No. 478,325

2 Claims. (Cl. 23—73)

This invention relates to a method of making and unifying lead oxids and of making therefrom lead carbonate or white lead and other lead compounds, such as acetates, chromates, sulphates, and the like.

The invention has for its further object the production of a true lead carbonate and other pigments in a more expeditious manner than has been heretofore possible. This achievement I attribute to my discovery of atomizing metallic lead under oxidizing conditions and of unifying the lead oxids in solution so as to form what I believe is a uniform and true lead oxid. This lead oxid or lead compound may then be converted into the desired pigments or other lead compounds.

In a preferred method I start with molten lead and form therefrom a powdery metallic compound of bluish color which I believe contains oxid coatings and possibly some other compounds. One way of forming this metallic compound consists in flowing a stream of the molten lead into a jet of heated acidulated water vapor and oxygen. The molten metal and heated vapor compounds are forcibly intermingled. This may be accomplished by forming a vapor jet under pressure, preferably in the form of a V-shaped trough and flowing the molten lead into this trough to obtain the bluish powdery metallic product. The powdery product is stable in a dry atmosphere. It can, however, be conveniently kept under a dilute acetic acid solution, and for the purpose of manufacture I discharge the metallic compound directly into a weak acetic acid solution.

The next step in the process comprises conversion of the powdery lead product into the oxid or oxids. An efficient way of obtaining the lead oxid or oxids is by transferring the acetic acid solution and metallic particles into an agitating vessel closed to the atmosphere and provided with means for supplying oxygen while the mass is agitated and the lead particles repeatedly exposed to the oxidizing atmosphere. In the course of an hour (more or less) I find that the lead particles have in part or wholly been converted into what I believe to be oxids and sub-oxids of lead.

The solution at this stage has a milky appearance. Any lead particles and free metallic lead are now removed from the solution, which is then agitated in the presence of an atmosphere containing oxygen, preferably at room temperature and under slight pressure, until the solution becomes of a creamy consistency. At this stage I believe the axids or sub-oxids have all been unified and formed into a true lead oxid. At this stage it is possible to convert the solution into either a carbonate, acetate, chromate, sulphate, or other lead compound.

The method may be carried out by any suitable apparatus, such as described in the accompanying drawing, in which—

Figure 1 is an arrangement suitable for carrying out the several steps in the method;

Fig. 2 is an end view showing the V-slot for producing the jet into which the molten lead is delivered;

Fig. 3 is a detail of the agitating vessel or tumbler barrel; and

Fig. 4 is a view taken on the line 4—4 of Fig. 3.

To obtain the powdery lead particles in a fine state in a continuous manner I find it convenient to heat the lead in a receptacle 10 in any convenient manner, as by a furnace 11. The heated lead is delivered by a pipe 12 into a jet 13. This jet, as stated above, comprises acidulated water vapor or steam mixed with oxygen and is superheated by passing through the jacket 14 in the furnace. The jet itself is formed into a V-shaped trough by reason of the V-shaped slot 15 being cut in the cap 16 of the tube 14. Oxygen and steam are supplied as desired by the respective pipes 17 and 18. Acetic acid vapor is supplied by tube 19 and is obtained from a convenient source, as a closed receptacle 20, having therein a partition wall 21 into which air is forced by the air inlet 22. The mixture may be controlled by regulating the valves 23, 24, 25, and 26. It will be seen that this arrangement provides a mixture of acidulated water vapor and oxygen which may be heated to a desired degree and is forced out in a V-shaped trough into which the molten lead is blown and wherein it is broken up into fine particles which have a bluish tinge and constitute the source of lead and lead compounds for my process.

As a means of convenience for storing the lead powder thus obtained I provide a receptacle 27 containing dilute acetic acid water 28 into which the lead particles 29 are deposited.

The next step in the process is the production of the lead oxid or oxids or other compounds. This may be conveniently accomplished by transferring the acidulated water and powdered lead mixture from vessel 27 to a tumbler barrel 30. This vessel may be of any desired construction and for convenience and as a means of illustration I have shown in Figs. 3 and 4 the detailed construction suitable for carrying out my process. For this purpose I provide agitator blades 31, 32 and 33. Blades 31 and 33 are end blades which slope towards the center of the barrel, while blades 32 overlap the end blades. These blades are given a slant so that the water solution will drain quickly when the barrel is rotated. The metallic or solid particles however will be carried on the blades until the individual blades reach a considerable elevation above the center at approximately the position A in Fig. 4, at which point and above the solid particles will roll from the agitator blades and drop onto the separating screen 34. The purpose of this screen is to break up any lead masses and to separate the particles so that the oxygen in the atmosphere within the barrel may attack the lead. Any suitable source of oxygen may be had and which may be supplied by a pipe 35 passing through the hollow journal 36 into the barrel from which it may be permitted to pass out through the opposite journal 37. The barrel is rotated by suitable means, such as a pulley 38.

After the lead particles have been converted into the oxid, sub-oxid, or other compounds and a milky solution has been obtained the milky solution may then be drawn off from the agitating vessel and transferred to a similar agitating vessel 30' where the mixture is unified or converted into what I believe to be a true lead oxid. This is accomplished by agitating the liquid in the presence of an oxygen containing atmosphere for a period of time sufficient to convert the lead compounds into the uniform lead oxid. This may be determined by noting the consistency which has now changed from a milky white to a creamy texture. After the mixture has been unified it may be stored if desired or converted directly into the lead carbonate or other desired lead compounds, such as acetates, chromates, sulphates, and the like.

When it is desired to form the carbonate or white lead the solution is agitated by passing therethrough carbon dioxid until the creamy solution has been converted into a pasty mass. This mass may then be dried and is available as a carbonate for making white lead paints. The product thus obtained is pure white in color, very soft and fluffy in texture, entirely free of crystals, and is amorphous in form. It is found by actual test that a given quantity of the lead carbonate thus prepared has greater covering qualities than lead carbonates made by the known processes.

I claim:

1. The method of making lead carbonate which comprises atomizing metallic lead in a stream of heated acetic acid vapor, water-vapor and oxygen to form fine particles, then mixing said particles with water containing acetic acid, then agitating said mixture in the presence of oxygen until a milky solution is obtained, then withdrawing the milky solution and separating any remaining metallic lead therefrom, then unifying the milky solution by agitating the same in the presence of oxygen until the solution turns to a creamy consistency, and then agitating said creamy solution in the presence of carbon dioxid to a pasty mass.

2. The method of making lead carbonate which comprises atomizing metallic lead in a jet of hot acidulated water-vapor and oxygen to form fine particles, then mixing said particles with a weak acetic acid solution, then agitating said mixture and exposing the particles in an atmosphere containing oxygen and acidulated water vapor until a milky solution is obtained, then removing from the milky solution any remaining metallic particles, and agitating the said solution in an atmosphere containing oxygen until the solution is unified to a creamy consistency, and finally agitating said creamy solution in an atmosphere containing carbon dioxid until a pasty mass is obtained.

ADDISON APPLEGATE.